US009130201B2

(12) United States Patent
Blunk et al.

(10) Patent No.: US 9,130,201 B2
(45) Date of Patent: *Sep. 8, 2015

(54) CONDUCTIVE AND HYDROPHILIC SURFACE MODIFICATION OF FUEL CELL BIPOLAR PLATE

(75) Inventors: Richard H. Blunk, Macomb Township, MI (US); Ping Liu, Irvine, CA (US); Sky Leigh Van Atta, Los Angeles, CA (US); Kevin W. Kirby, Calabasas Hills, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 868 days.

This patent is subject to a terminal disclaimer.

(21) Appl. No.: 12/505,557

(22) Filed: Jul. 20, 2009

(65) Prior Publication Data

US 2011/0014548 A1 Jan. 20, 2011

(51) Int. Cl.
| H01M 2/00 | (2006.01) |
| H01M 4/82 | (2006.01) |
| C07C 303/02 | (2006.01) |
| C25D 5/34 | (2006.01) |
| B05D 5/12 | (2006.01) |
| H01M 8/02 | (2006.01) |

(52) U.S. Cl.
CPC .......... *H01M 8/0228* (2013.01); *H01M 8/0206* (2013.01); *H01M 8/0213* (2013.01); *H01M 8/0221* (2013.01); *Y02E 60/50* (2013.01); *Y10T 29/49115* (2015.01)

(58) Field of Classification Search
CPC ............ H01M 8/0206; H01M 8/0213; H01M 8/0221; H01M 8/0228
USPC ........................................................ 429/518
See application file for complete search history.

(56) References Cited

U.S. PATENT DOCUMENTS

| 5,554,739 | A | 9/1996 | Belmont |
| 5,922,118 | A | 7/1999 | Johnson |
| 7,550,222 | B2 | 6/2009 | Vyas |
| 7,977,012 | B2* | 7/2011 | Li et al. .......................... 429/518 |
| 2005/0221139 | A1* | 10/2005 | Hampden-Smith et al. ..... 429/32 |
| 2006/0147629 | A1* | 7/2006 | Wang et al. ................ 427/249.1 |
| 2006/0240305 | A1* | 10/2006 | Huang ............................ 429/34 |
| 2006/0257712 | A1 | 11/2006 | Elhamid et al. |

(Continued)

FOREIGN PATENT DOCUMENTS

| CN | 1893156 A | 1/2007 |
| CN | 101213701 A | 7/2008 |

(Continued)

OTHER PUBLICATIONS

Chinese Office Action dated May 6, 2014 ; Application No. 201010280848.6 ; Applicant: GM Global Technology Operations, Inc. ; 5 pages.

(Continued)

*Primary Examiner* — Carlos Barcena
(74) *Attorney, Agent, or Firm* — BrooksGroup (57) ABSTRACT

A fuel cell comprises a bipolar plate having a cationic polymer layer and a conductive and hydrophilic surface layer disposed on at least a portion of its exterior area. The surface layer comprises a conductive carbon material having a hydrophilic organic group ionically attached to its surface. A process of producing a bipolar plate and a fuel cell is also disclosed.

19 Claims, 6 Drawing Sheets

(56) References Cited

U.S. PATENT DOCUMENTS

| | | |
|---|---|---|
| 2007/0003813 A1 | 1/2007 | Vyas et al. |
| 2007/0098908 A1* | 5/2007 | Angelopoulos et al. ... 427/407.1 |
| 2008/0113245 A1* | 5/2008 | Liu et al. .................. 429/34 |
| 2009/0286132 A1* | 11/2009 | Blunk et al. ................ 429/34 |
| 2010/0136462 A1* | 6/2010 | Blunk et al. ................ 429/518 |

FOREIGN PATENT DOCUMENTS

| | | |
|---|---|---|
| CN | 101378845 A | 3/2009 |
| CN | 101901912 A | 12/2010 |
| WO | 2007076233 A2 | 7/2007 |

OTHER PUBLICATIONS

Chinese Office Action dated Mar. 27, 2013; Application No. 201010280848.6; Applicant: GM Global Technology Operations, Inc.; 11 pages.

Chinese Office Action dated Oct. 11, 2014 ; Application No. 201010280848.6 ; Applicant: GM Global Technology Operations, Inc.; 12 Pages.

\* cited by examiner

CONDUCTIVE AND HYDROPHILIC SURFACE MODIFICATION OF FUEL CELL BIPOLAR PLATE

TECHNICAL FIELD

The field to which the disclosure generally relates includes fuel cell bipolar plates.

BACKGROUND

A fuel cell usually consists of a series of membrane electrode assemblies and bipolar plates stacked together in an alternating manner. The membrane electrode assembly is typically made of an ion conductive membrane sandwiched between an anode and a cathode sections each on the opposite side of the membrane. A bipolar plate is a plate-like electric conductor, having a plurality of channels for fluid passage. Reactive gases that supply to a fuel cell flow through those channels to reach the anode and cathode sections where electrochemical reactions of the gases take place, and from which electricity is produced. The electricity generated from the electrochemical reactions is collected and conducted through the bipolar plate to an external circuit. The bipolar plate, therefore, needs to have high electric conductivity or low contact resistance to reduce energy loss and heat buildup.

In the case of a hydrogen fuel cell, water management is one of the key challenges. Water is continuously generated in a hydrogen fuel cell and the ion conductive membrane needs to maintain a certain hydration level. When a hydrogen fuel cell is operated at a low current density, for example, at 0.2 A/$cm^2$, there would not be enough gas flow to remove the water generated from the electrochemical reaction at the cathode section. Water drops can form in the fluid passages and block the supply of a reactive gas to the electrode. Without the supply of a reactant gas, the blocked section of the fuel cell will not produce electricity. Performance of the fuel cell will deteriorate due to non-homogeneous current distribution. Such phenomenon is known as low power stability (LPS).

Conventional hydrophilic coatings or treatments on a bipolar plate can improve water management, but usually adversely affect the electric contact resistance. Conventional hydrophilic coatings and treatments can also cause an increase in water leachable contaminants and electrochemical degradation of the bipolar plate, electrodes and membranes.

SUMMARY OF EXEMPLARY EMBODIMENTS OF THE INVENTION

One embodiment includes a fuel cell bipolar plate having a conductive and hydrophilic surface layer disposed on at least a portion of its exterior area. The surface layer comprises a conductive carbon material having a hydrophilic organic group covalently attached to its surface.

Another embodiment includes a process for manufacturing a bipolar plate comprising providing a fuel cell bipolar plate having a carbon material disposed on at least a portion of its exterior area; contacting the carbon material with an organic molecule having at least one hydrophilic group; and causing the organic molecule to react with the carbon material such that the hydrophilic group is covalently attached to the carbon material.

Another embodiment includes a process comprising providing a carbon material and a fuel cell bipolar plate; covalently attaching a hydrophilic organic group onto the carbon material through a chemical reaction; and depositing the carbon material on at least a portion of the exterior area of the bipolar plate to form a conductive and hydrophilic surface layer. A fuel cell stack can be assembled using the bipolar plate.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
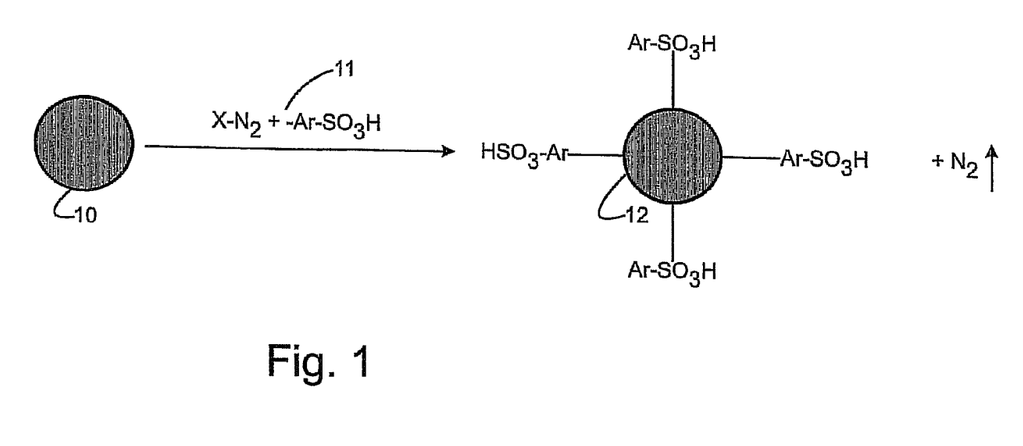
FIG. 1 is a schematic illustration of an exemplary chemical modification of a carbon material surface layer.

Various chemical reactions may be employed to modify the surface of a carbon material to render it hydrophilic. An exemplary reaction between a carbon material and an aromatic diazonium salt is illustrated in FIG. 1. In this example, an organic diazonium salt 11 represented by the formula, $X^-N_2^+$—Ar—$SO_3H$, is allowed to react with a carbon material 10 to form a modified carbon material 12 having a hydrophilic aromatic sulfonate (—Ar—$SO_3^-$) group covalently attached to the carbon material surface. Nitrogen gas, $N_2$, is released as a product of such reaction. "Ar" in the diazonium salt is an aromatic radical, "—$N_2^+$" is a diazonium radical, and "$X^-$" is an anion. Similar reactions between a diazonium salt and a carbon material are described in U.S. Pat. Nos. 5,554,739 and 5,922,118, which are incorporated herein by reference. Other chemical reactions between a carbon material and a molecule comprising a hydrophilic group can be employed in a similar manner to covalently attach a hydrophilic group to a carbon material.

Any organic molecules comprising a hydrophilic group HG represented by the chemical formula, $X^-N_2^+$—Ar—HG, may be used to react with a carbon material. Examples of the anionic group, $X^-$, may include sulfate, carbonate, nitrate, chloride, bromide, iodide, fluoride, phosphate, borate, chlorate, hydroxide, and silicate. Examples of the aromatic radical, Ar, may include a radical of benzene, naphthalene, alkylbenzene, biphenyl, triphenyl, phenol, pyridine, anthracene, pyrene, phenyl ether, phenyl ester, and any of their respective derivatives. A hydrophilic group, —HG, is an organic radical having strong polarity and is capable of rendering the surface of a carbon material surface hydrophilic when covalently attached to carbon surface. The hydrophilic group can be an anionic, cationic, or nonionic radical. The ionic character of the carbon-attached hydrophilic groups increases the robustness to contamination, i.e., the surface remains hydrophilic longer in the presence of air hydrocarbons. Examples of anionic hydrophilic groups include sulfonic acid, carboxylic acid, phosphonic acid, boronic acid, and their respective salts. Examples of non-ionic hydrophilic groups may include a radical of alcohol, ketone, ethoxyl, polyethylene oxide, methoxyl, amide, and urea. Examples of cationic hydrophilic groups may include a radical of primary amine, secondary amine, tertiary amine, quaternary amine, pyridinium, and phosphonium group.

The organic molecule, $X^-N_2^+$—Ar—HG, may be prepared by combining an aromatic amine comprising a hydrophilic group, —HG, with a nitrite salt, nitrous acid, nitrogen dioxide or mixture of nitrogen mono-oxide and nitrogen dioxide in-situ. Examples of the aromatic amines may include sulfanilic acid, 4-aminobenzoic acid, 4-amino salicylic acid, 7-amino-4-hydroxy-2-naphthlenesulfonic acid, aminophenylboronic acid, aminophenylphosphonic acid, 4-aminophthalic acid, 2-amino-1-naphthalenesulfonic acid, 5-amino-2-naphthalenesulfonic acid, metanilic acid, N-(4-aminobenzoyl)-B-alanine, N-(4-aminobenzoyl)-L-glutamic acid), p-Aminohippurric acid, 2-naphthylamine 1-sulfonic acid (Tobias Acid), and 1-amino-4-(trialkylamino)-benzene. When a nitrite salt, such as sodium nitrite, potassium nitrite, or magnesium nitrite, is used, an acid may be further included to facilitate the formation of the diazonium salt molecule. Any organic and inorganic acid may be used, including, for example, formic acid, acetic acid, hydrochloric acid, nitric acid, sulfuric acid, phosphoric acid, and toluenesulfonic acid. Several exemplary reactions are shown in the following reaction schemes (1-3):

The carbon material may include any electrically conductive form of carbon or carbon composite. Examples of carbon material may include graphite, carbon black, amorphous carbon, carbon fiber, carbon nanotube, and carbon composite.

The organic diazonium molecule may react with carbon material under a wide range of conditions. The reaction may be carried out in a temperature ranged from 0° C. to about 100° C., and a pH between 1 and 9. The reaction may be carried out in an aqueous solution, a polar organic solvent or a solvent mixture. The reaction can take place readily in an aqueous solution in the presence of an acid. Depending on the ratio of the organic molecule amount and surface area of the carbon material, various amounts of hydrophilic group may be covalently attached to the surface of the carbon material. The amount of covalently attached hydrophilic group on the carbon material may range from about 0.01 to about 5 millimoles per square meter ($mmol/m^2$), or 0.1 to 4 $mmole/m^2$. The water contact angle of the modified carbon material surface layer is typically below about 40 degrees, or below 20 degrees.

The modified carbon material having hydrophilic group, HG, covalently attached to its surface exhibit hydrophilic properties and good electric conductivity. Different from a conventional coating using inorganic oxides or hydrophilic resins, the covalently attached hydrophilic group does not leach out into water during fuel cell operation. The hydrophilic effect is very durable and electrochemically stable under wide range of fuel cell operating conditions. The electric contact resistance of the modified carbon surface layer is typically close to that of the same carbon surface layer without modification. Although the Applicant does not wish to be bound to or by any particular theory, it is believed that the high polarity of the hydrophilic group at a molecular thickness on the surface of a carbon material does not adversely affect the electric conduction across a contact interface. When an ionic hydrophilic group is attached on the carbon material surface, ionic conduction mechanism is also possible. Some of the hydrophilic groups, such as benzenesulfonic acid, benzenephosphonic acid, benzenecarboxylic acid, phthalic acid, terephthalic acid, isophthalic acid, their corresponding salts and derivatives, exhibit high electrochemical stability, and thus withstand harsh operating conditions in a demanding fuel cell design.

Figure 2:
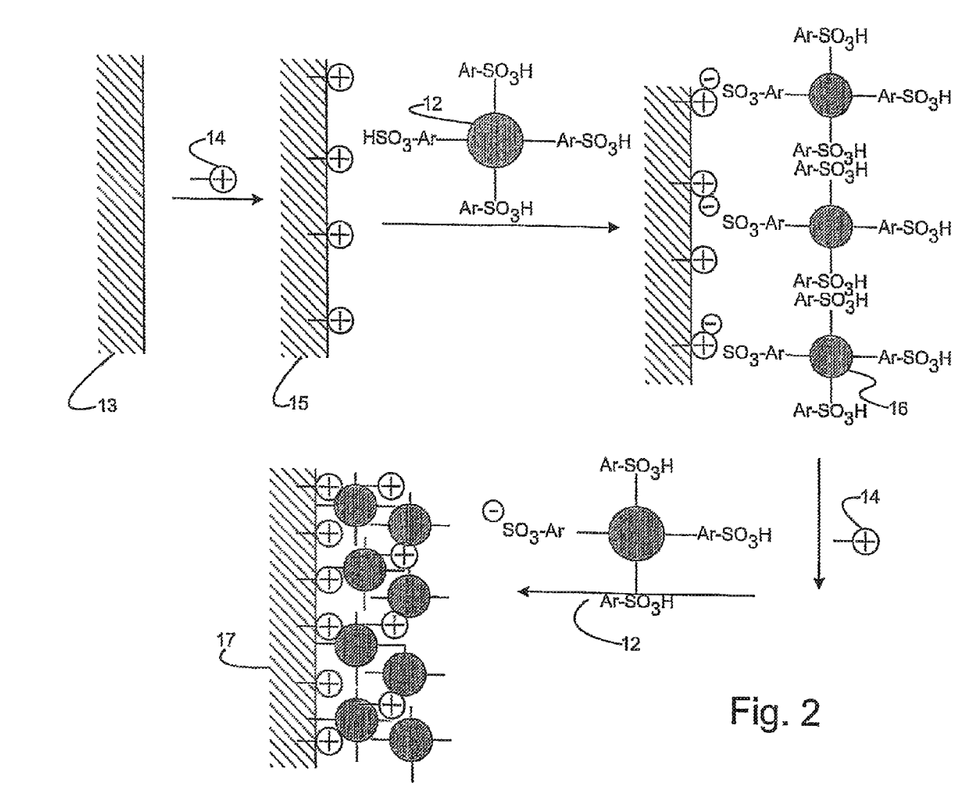
FIG. 2 is a schematic illustration of an exemplary ionic adsorption process to deposit a hydrophilic and conductive carbon material on a bipolar plate surface.

A modified carbon material may be deposited on a fuel cell bipolar plate using various deposition processes including, but not limited to, ionic adsorption, chemical vapor deposition, physical vapor deposition, atomic layer deposition, spray coating, plasma deposition, dip coating, drawn-down coating, printing, electrochemical deposition, and thermal spray processes. An exemplary ionic adsorption process is illustrated in FIG. 2. A bipolar plate 13 is first brought in contact with a solution containing a cationic species 14. The cationic species is typically a molecule or a resin comprising a cation that can be adsorbed or otherwise be bounded on the surface of the carbon material. Exemplary cationic species may include polyamines, quaternary ammonium salts, polyethyleneimine, diethylaminoethyl(meth)acrylate polymers and copolymers, triethylaminoethyl(meth)acrylate polymers and copolymers, dimethylaminoethyl(meth)acrylate polymers copolymers, trimethylaminoethyl(meth)acrylate polymers copolymers, copolymer of acrylamide and trimethylaminoethyl methacrylate methylsulfate, organic phosphoium salt, Poly(allylamine hydrochloride), Poly(diallyl dimethylammonium chloride). The bipolar plate 15 with adsorbed cationic species is obtained, and may be rinsed in water to remove any un-bounded ionic species. The bipolar plate 15 with adsorbed species is subsequently brought in contact with a dispersion comprising the modified carbon material 12 having an anionic sulfonate hydrophilic group, —Ar—$SO_3H$. The strong ionic attraction force between the adsorbed cation and the anionic sulfonate group on the carbon material causes the carbon material 12 to deposit on the bipolar plate as a surface layer. The ionic adsorption process can be repeated multiple times to obtain multilayers of the carbon materials on the bipolar plate exterior area. A bipolar plate 17 having two layers of the modified carbon surface layer, for example, can be prepared as illustrated in FIG. 2 when the ionic adsorption process is performed twice. A particulate form of carbon material may be deposited on a bipolar plate as shown in FIG. 2 to form a microporous two dimensional or 3 dimensional surface layer(s). The microporous structure is characterized by the micro- or nanoscale pores or voids between carbon particulates. Some of the pores or voids may be inter-connected. Such a microporous structure can effectively spread out a water drop before it blocks a gas channel and enhance the water wicking effect of a bipolar plate surface for improved water management in a fuel cell. The carbon particulate may have an average particle size less than about 40 microns or 325 mesh size. Particle size between about 1 nanometer and 40 microns can be used accordingly. Examples of particulate carbon materials may include carbon black, carbon nanotube, ground graphite, fullerene, synthetic carbon microspheres, and the like. The modified carbon particulates can also be applied to a bipolar plate exterior area by dip coating, spray coating, printing or similar method. A resin binder may be used in combination with the modified carbon particulate to form a durable coating layer. In yet another embodiment, in addition to the cationic polymer used in the ionic adsorption coating method, a metal oxide such as, but not limited to, $TiO_2$ or ZnO may be used. That is the metal oxide may be deposited on the bipolar plate, and thereafter the bipolar plate 15 with the metal oxide thereon is brought in contact with a dispersion comprising the modified carbon material 12. The hydrophilic carbon is attached ionically to the positively charged hydroxyl groups of the metal oxides (low pH; 3 to 5). These metal oxides are more hydrolytically stable than the polymer cations.

The bipolar plate substrate may be constructed using any electrically conductive and mechanically robust materials. Examples of bipolar plate substrate may include, but not limited to, graphite plate, carbon fiber reinforced composite, carbon fiber reinforced carbon composite, stainless steel alloys, titanium, titanium alloys, copper alloys, aluminum, aluminum alloys, and the like. When a metal or metal alloy is used as the bipolar plate substrate, a corrosion resistant and conductive coating or treatment may be applied to the surface of the bipolar plate before a layer of carbon material is deposited. The corrosion resistant coating or treatment may comprise noble metal (such as gold, Platinum, Ruthenium, Rhodium, Palladium, Indium, and Osmium), conductive metal oxides, metal nitrides, metal oxynitride, and carbon. A metal bipolar plate may also be passivated chemically or electrochemically by anodization. The corrosion resistant coating or treatment may be applied by chemical vapor deposition, physical vapor deposition, atomic layer deposition, spray coating, plasma deposition, dip coating, electrochemical deposition, and thermal spray processes.

Figure 3:
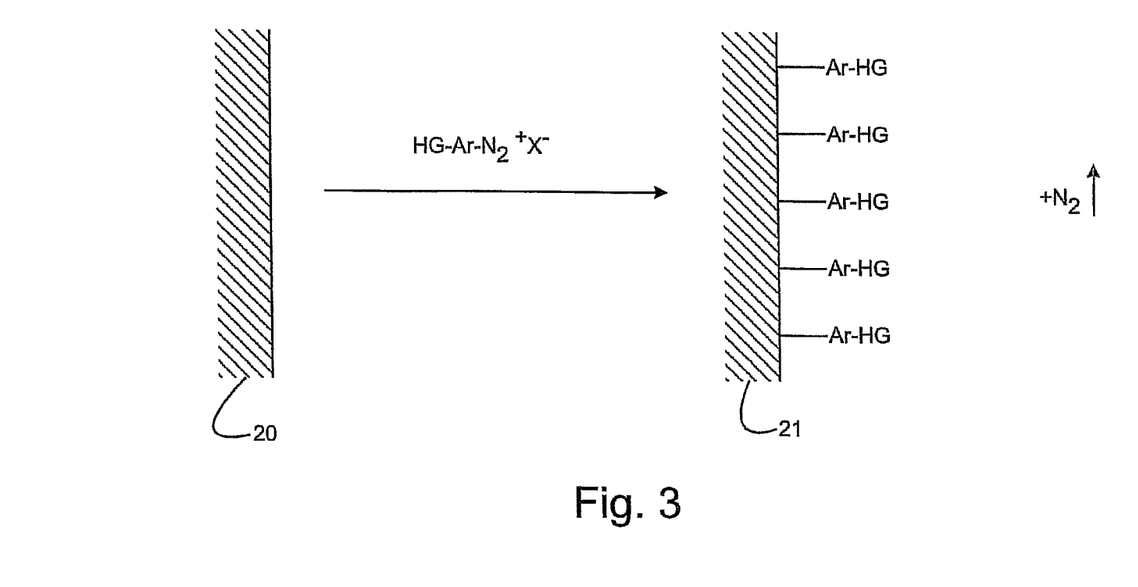
FIG. 3 is a schematic illustration of an exemplary chemical modification of a bipolar plate exterior area.

A bipolar plate may be constructed using a graphite or a carbon composite material. The gas flow channel and other mechanical features may be molded or mechanically created on the plate. As illustrated in FIG. 3, a carbon bipolar plate 20 is brought in contact with a solution comprising a diazonium salt represented by the chemical formula, HG-Ar—$N_2^+X^-$. HG is a hydrophilic group, Ar is an aromatic group, —$N_2^+$ is a diazonium group, and $X^-$ is an anion. The diazonium salt may be prepared or generated in-situ as described previously. The diazonium salt can react readily with the carbon based bipolar plate surface, resulting in covalent attachment of the organic hydrophilic group, —Ar—HG on the carbon bipolar plate surface. Thus a bipolar plate 21 having covalently attached organic hydrophilic groups is obtained. Various anionic, cationic and non-ionic hydrophilic groups may be covalently attached to the bipolar plate using this process.

Figure 4:
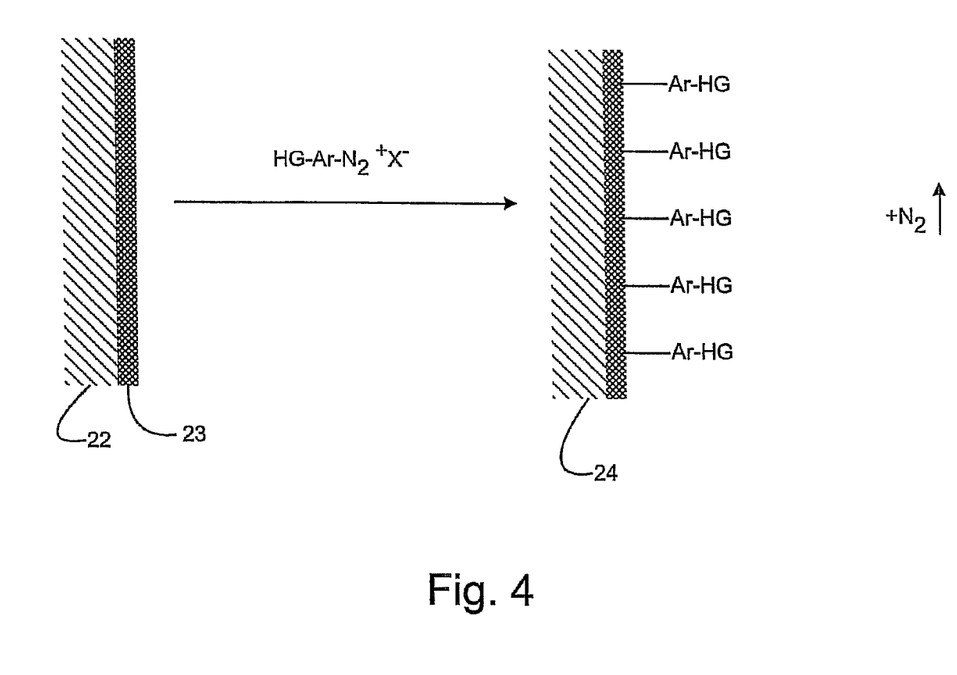
FIG. 4 is a schematic illustration of an exemplary chemical modification of a bipolar plate having a carbon material surface layer.

Referring to FIG. 4, a bipolar plate may be produced by first depositing a carbon layer 23 on a metal, carbon or composite bipolar plate 22. The carbon layer 23 may be deposited using any known deposition methods such as physical vapor deposition, chemical vapor deposition, coating, plasma deposition, atom layer deposition and thermal spray processes. As shown in FIG. 4, the bipolar plate with a carbon layer is then brought in contact with a diazonium salt, HG-Ar—$N_2^+X^-$, as described above. The chemical reaction between the diazonium salt and the carbon layer results in covalent attachment of the organic group —Ar—HG to the carbon layer of the bipolar plate 24. The carbon layer may be a solid carbon layer or a microporous carbon layer, depending on the deposition process used and the selection of carbon material.

Figure 5:
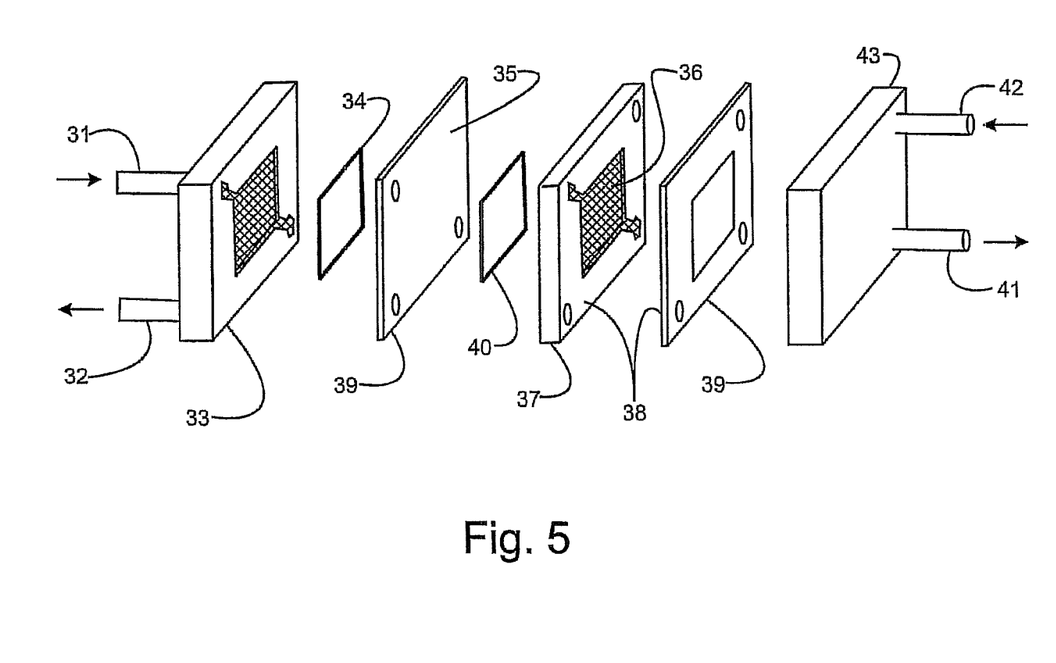
FIG. 5 is a schematic drawing of an exemplary fuel cell stack in an un-assembled perspective view.
Figure 6:
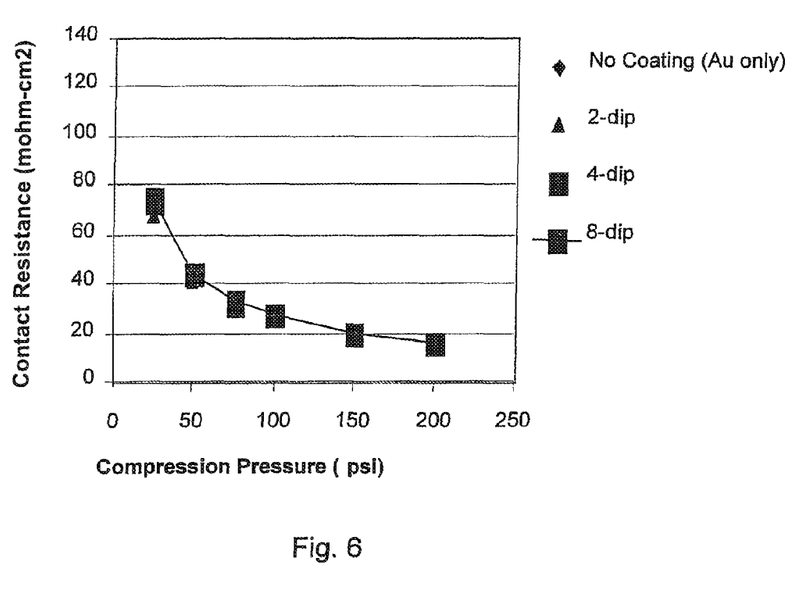
FIG. 6 is a graph showing that a gold coated bipolar plate without any carbon surface layer has very similar contact resistance as similar bipolar plate with a deposited modified carbon surface layer.

A fuel cell may be produced using the bipolar plate described above. Referring to FIG. 5, an exemplary fuel cell with a membrane electrode assembly (MEA) 39 incorporated therein along with other fuel cell stack components is shown in pictorial unassembled form. The MEA 39 comprises an ion conductive electrolyte membrane 35 sandwiched between a catalyst loaded anode 40 and a catalyst loaded cathode 34.

The fuel cell shown in FIG. 5 comprises stainless steel endplates 33, 43, the bipolar plates 37 with gas flow channels 36 to facilitate gas supply and distribution, and the membrane electrode assembly 39. The stacking unit 38 comprising a bipolar plate 37 and a MEA 39 may be repeated multiple times for higher energy output capability. The fuel cell includes reactant gases, one of which is a fuel (such as hydrogen) supplied from fuel inlet 42, and another is an oxidizer gas supplied from inlet 31. The corresponding outlets for the fuel gas 32 and oxidizer gas 41 are also provided. The fuel gas may be a hydrogen gas and the oxidizer gas may be air or oxygen. The gases supplied to the fuel cell diffuse through respective bipolar plates 37 to the respective anodes and cathodes of the MEA 39 for electrochemical reactions and generation of electricity. A gas diffusion media (typically made of carbon cloth or carbon paper, not shown in the drawing) may also be included between the bipolar plate and the MEA.

EXAMPLE 10 grams of carbon black power, Vulcan XC-72, obtained from Cabot Corporation, was mixed with 250 ml of 0.05M nitric acid($HNO_3$), 15 ml isopropyl alcohol (as a wetting agent), and 30 milli-mole of sulfanilic acid (purchased from Aldrich). The mixture was stirred and maintained at about 0° C. A solution of 33 milli-mole of sodium nitrite ($NaNO_2$) dissolved in 30 ml water was added to the above mixture dropwise under stirring. The mixture was stirred for 2 hours at about 0° C. before 150 milli-moles of formic acid was added dropwise to the mixture. The mixture was allowed to warm up to room temperature gradually overnight and subsequently heated to about 70° C. for about 1 hour. The carbon black surface is thus modified by a covalently attached benzenesulfonic acid group as illustrated in the following reaction scheme:

The modified carbon in the mixture is separated by centrifugation, and purified by a sonication-centrifugation-decant process in water. The purified carbon material is dried in vacuum.

A ferritic (e.g., 430) or austentic (e.g., 316L) stainless steel bipolar plate having gas flow channels created by a stamping process is deposited with a gold surface layer by physical vapor deposition method.

An ionic adsorption process was subsequently used to form a hydrophilic and conductive carbon surface layer on the bipolar plate. A cationic layer was first adsorbed on the bipolar plate by dipping the bipolar plate into an aqueous solution of a poly(trimethylaminoethyl methacrylate-co-acrylamide) methylsulfate. The bipolar plate was then rinsed in de-ionized water before dipping into a suspension of the modified Vulcan XC-72 carbon black as described above. Due to the strong ionic interaction between the covalently attached sulfonic acid anionic group and the adsorbed cationic polymer, the modified carbon black formed a strongly adsorbed carbon surface layer. The bipolar plate was then rinsed in water to remove any residue salt. The above ionic adsorption process was performed 2, 4, and 8 times (herein referred to as 2 dip, 4 dip and 8 dip) individually on 3 separate bipolar plates before the bipolar plates were dried. The anode side of the bipolar plate was pressed against a Teflon coated carbon paper gas diffusion layer at various pressures for contact resistance (also called Interfacial Contact Resistance) measurement. The results are shown in the graph. A contact resistance of about 20 milli-ohm $cm^2$ (mohm-$cm^2$) at about 150 Psi can be obtained. The gold coated bipolar plate without any carbon surface layer has very similar contact resistance as similar bipolar plate with a deposited modified carbon surface layer. Furthermore, the bipolar plate having a conductive and hydrophilic carbon surface layer exhibits a water contact angle of 10 degree or less initially, and less than about 20 degrees after 45 days soaking in 80° C. water, indicating a durable hydrophilic effect. In a number of variations, the hydrophilic organic group is at least one of a carboxylic acid, benzenesulfonic acid, alcohol, amine, amide, poly(ethylene oxide), ethoxyl, methoxyl, phosphonic acid, naphthenesulfonic acid, salicylic acid, phenylphosphonic acid, benzoic acid, phthalic acid group and a salt of an of the above mentioned acids. In a number of variations, the conductive and hydrophilic surface layer has a water contact angle of 40 degree or less, and a contact resistance less than about 20 mohm-$cm^2$ at 200 psi compression pressure.

The above description of embodiments of the invention is merely exemplary in nature and, thus, variations thereof are not to be regarded as a departure from the spirit and scope of the invention.

What is claimed is:

1. A product comprising a fuel cell bipolar plate having an external surface, a cationic polymer layer over the external surface, a conductive and hydrophilic surface layer disposed over at least a portion of the external surface; wherein said conductive and hydrophilic surface layer comprises a conductive carbon material having a hydrophilic organic group, the conductive carbon material ionically attached to one of the cationic polymer layer wherein the cationic polymer layer comprises at least one of a polyethyleneimine, diethylaminoethyl (meth)acrylate polymer and copolymer, triethylaminoethyl (meth)acrylate polymers and copolymer, dimethylaminoethyl (meth)acrylate polymer copolymer, trimethylaminoethyl (meth)acrylate polymer copolymer, tyimethylaminoethyl methacrylate methylsulfate, organic phosphonium salt, or poly(diallyl dimethylammonium chloride).

2. A product as set forth in claim 1, wherein said carbon materials is a carbon black, graphite, carbon fiber, amorphous carbon, or carbon nanotube.

3. A product as set forth in claim 2, wherein said surface layer is a microporous carbon layer, and said carbon material is a carbon black.

4. A product as set forth in claim 1, wherein said hydrophilic organic group is at least one of a carboxylic acid, benzenesulfonic acid, alcohol, amine, amide, poly(ethylene oxide), ethoxyl, methoxyl, phosphonic acid, naphthenesulfonic acid, salicylic acid, phenylphosphonic acid, benzoic acid, phthalic acid group and a salt of any of the above mentioned acids.

5. A product as set forth in claim 1, wherein said surface layer has a water contact angle of 40 degree or less, and a contact resistance less than about 20 mohm-cm$^2$ at 200 psi compression pressure.

6. A product as set forth in claim 1, wherein said bipolar plate comprises a metal or metal alloy of aluminum, titanium, stainless steel, copper, nickel or chromium.

7. A product as set forth in claim 1 wherein carbon material consists essentially of carbon.

8. A product as set forth in claim 1 wherein said conductive and hydrophilic surface layer consists of a conductive carbon material having a hydrophilic organic group.

9. A product comprising a fuel cell bipolar plate having an external surface, a cationic polymer layer over the external surface, a conductive and hydrophilic surface layer disposed over at least a portion of the external surface; wherein said conductive and hydrophilic surface layer comprises a conductive carbon material having a hydrophilic organic group, the conductive carbon material ionically attached to the cationic polymer layer wherein said hydrophilic organic group is at least one of an ehyoxyl, methoxyl, salicylic acid, benzoic acid, phthalic acid group or a salt of any of the above mentioned acids.

10. A product as set forth in claim 9, wherein said carbon material is a carbon black, graphite, carbon fiber, amorphous carbon, or carbon nanotube.

11. A product as set forth in claim 10, wherein said surface layer is a micorporous carbon layer, and said carbon material is a carbon black.

12. A product as set forth in claim 9, wherein said surface layer has a water contact angle of 40 degree or less, and a contact resistance less than about 20 mohm-cm$^2$ at 200 psi compression pressure.

13. A product as set forth in claim 9, wherein said bipolar plate comprises a graphite, carbon fiber or fiber reinforced carbon composite.

14. A product as set forth in claim 9, wherein said bipolar plate comprises a metal or metal alloy of aluminum, titanium, stainless steel, copper, nickel or chromium.

15. A product as set forth in claim 9, wherein said carbon material is a carbon black particle.

16. A product comprising a fuel cell bipolar plate having an external surface, a cationic polymer layer over the external surface, a conductive and hydrophilic surface layer disposed over at least a portion of the external surface; wherein said conductive and hydrophilic surface layer comprises a microporous structure comprising modified carbon particulates defining micro or nanoscale pores, the carbon particulates having a hydrophilic organic group attached thereto, the conductive carbon material ionically attached to the cationic polymer layer, wherein the cationic polymer layer comprises at least one of a polyethyleneimine, diethylaminoethyl (meth)acrylate polymer and copolymer, triethylaminoethyl (meth)acrylate polymers and copolymer, dimethylaminoethyl (meth)acrylate polymer copolymer, trimethylaminoethyl (meth)acrylate polymer copolymer, trimethylaminoethyl methacrylate methylsufate, organic phosphonium salt, or poly(dially dimethylammonium chloride).

17. A product as set forth in claim 16, wherein the carbon particulates have a particle size ranging from about 1 nanometer to 40 microns.

18. A product comprising a fuel cell bipolar plate having an external surface, a cationic polymer layer over the external surface, a conductive and hydrophilic surface layer disposed over at least a portion of the external surface; wherein said conductive and hydrophilic surface layer comprises modified carbon particulates in a resin binder, the modified carbon particulates having a hydrophilic organic group attached thereto, the conductive carbon material ionically attached to the cationic polymer layer wherein said hydrophilic organic group is at least one of a ethoxyl, methoxyl, salicylic acid, benzoic acid, phthalic acid group or a salt of any of the above mentioned acids.

19. A product comprising a fuel cell bipolar plate having an external surface, a cationic polymer layer over the external surface, a conductive and hydrophilic surface layer disposed over at least a portion of the external surface; wherein said conductive and hydrophilic surface layer consisting of a conductive carbon material having a hydrophilic organic group, the conductive carbon material ionically attached to the cationic polymer layer wherein the cationic polymer layer comprises at least one of a polyethyleneimine, diethylaminoethyl (meth)acrylate polymer and copolymer, triethylaminoethyl (meth)acrylate polymers and copolymer, dimethylaminoethyl (meth)acrylate polymer copolymer, trimethylaminoethyl (meth)acrylate polymer copolymer, trimethylaminoethyl methacrylate methylsufate, organic phosphonium salt, or poly(diallyl dimethylammonium chloride), and wherein the conductive carbon material having a hydrophilic organic group includes carbon black nano-particles.

* * * * *